RICHARDSON, DAVIS & HOWELL.
Cane Mill.
No. 54,960. Patented May 22, 1866.
Fig: 1.
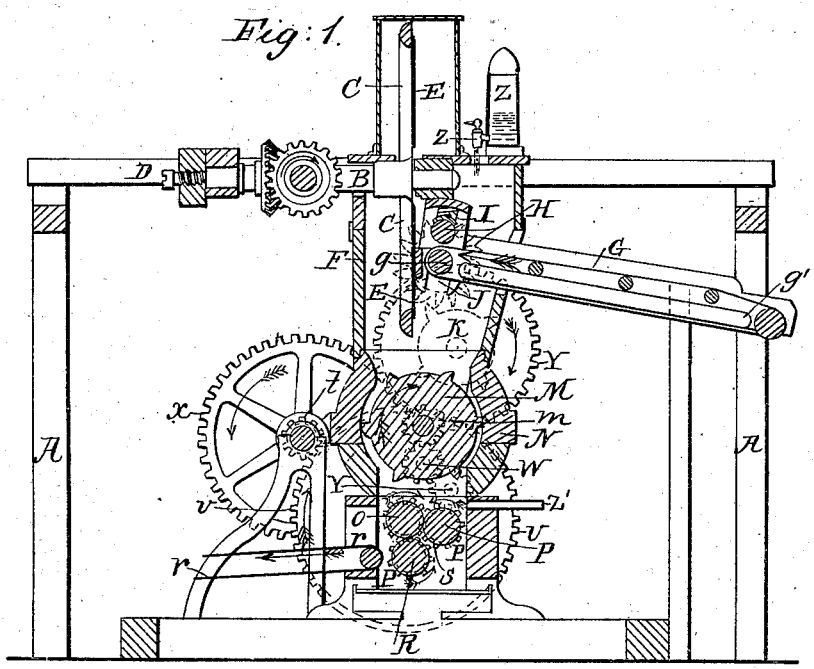
Fig: 2.
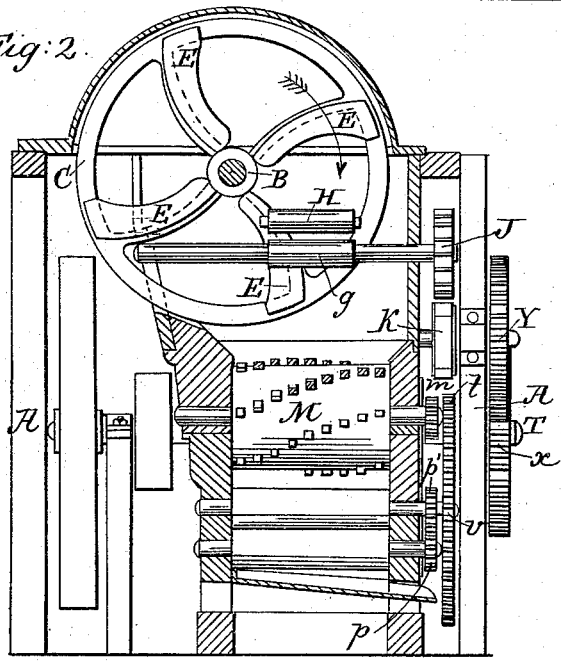
Witnesses.
James H. Layman
G. L. Fisher
Inventors.
J. W. Richardson
D. L. Davis
W. C. Howell

UNITED STATES PATENT OFFICE.

JOHN W. RICHARDSON, DANL. L. DAVIS, AND WM. C. HOWELL, OF SLIGO, OHIO.

IMPROVEMENT IN CANE-MILLS.

Specification forming part of Letters Patent No. 54,960, dated May 22, 1866.

*To all whom it may concern:*

Be it known that we, JOHN W. RICHARDSON, DANIEL L. DAVIS, and WILLIAM C. HOWELL, all of Sligo, in the county of Clinton and State of Ohio, have invented certain new and useful Improvements in Sugar-Mills; and we do hereby declare the following to be a full, clear, and exact description thereof, reference being had to the accompanying drawings, making part of this specification.

Our invention consists in a combination of cutting apparatus and grinding and pressing rollers, &c., whereby the cane can be more completely pressed and the juices more fully extracted than in previously-known devices.

Figure 1 is a transverse section across the axis of the grinding and pressing mechanism. Fig. 2 is a longitudinal section with the cutting apparatus in elevation.

A is the frame of the machine, supporting on suitable cross-timbers and journal-bearings the shaft B of the cutting-wheel C. The shaft B is provided with an adjustable end bearing or set-screw, D, to enable the operator to adjust the cutting-wheel so that the knives E may pass sufficiently close to the throat-piece F. The journal of the cutting-wheel is considerably above the mouth-piece F, and the knives are sickle-shaped, in order to effect a gradual sliding or draw cut over the piece F. By this device the cane is more easily and surely cut, and sudden strains are not thrown upon the cutting mechanism.

G is a canvas carrier or feeder stretched over rollers $g\ g'$, and H is a pressing-roller provided with spring-bearings I. The roller $g$ is provided with a feed-wheel, J, operated by a tooth-cam, K, so arranged and operated that the feed may be intermittent and the cane be fed to the knives only in the intervals which succeed the passage of one knife and precede the arrival of the succeeding one.

The cane, after cutting, passes to the grinding-mill, consisting of a toothed roller, M, and cylinder N, the teeth of the former being set spirally on the roller, as shown in Fig. 2, and the latter being provided with a set of knives or teeth, $n$, fitted to pass between the spaces on the toothed roller M.

After grinding, the cane passes through the pressing-rollers O P, a separator, S, causing the juices to fall into the pan or trough Q, while the bagasse passes *via* roller R to the carrier $r$.

The grinding, pressing, and feeding mechanism is operated by driving-shaft T, the motion being imparted successively from pinion $t$ to wheel U, roller-pinion $o$, roller-pinions $p\ p'$, idlers V W, and pinion $m$ on the grinding-roller M, and from wheel X on shaft T to wheel Y, cam K, and feed-wheel J.

Z is a box or reservoir provided with a faucet, $z$, through which a solution adapted to prevent the fermentation of the juices or the souring of the mill may be dripped onto the cane as it enters the mill.

$Z'$ is a steam-pipe to convey steam into the grinding and pressing chambers to warm and soften the cut cane, and thus enable a more complete extraction of the juices.

We claim herein as new and of our invention—

1. The provision, in a cane-mill, of the series of feeding, chopping, crushing, and expressing apparatus, arranged and co-operating as set forth.

2. The combination of the revolving sickle-formed knives E, throat-piece F, and intermittent feed mechanism G $g\ g'$ H I J K, substantially as set forth.

3. In a cane-mill arranged and operating substantially as described, the nozzle $Z'$, when used for injecting steam upon the cane while in the operation of being crushed, for the purpose set forth.

In testimony of which invention we hereunto set our hands.

JOHN W. RICHARDSON.
    DANIEL L. DAVIS.
    WM. C. HOWELL.

Witnesses:
 GEO. H. KNIGHT,
 JAMES H. LAYMAN.